United States Patent [19]

Krautter et al.

[11] Patent Number: 4,576,864
[45] Date of Patent: Mar. 18, 1986

[54] WATER SPREADING PLASTIC MATERIAL, METHOD FOR ITS MANUFACTURE AND ITS USE AS A GLAZING AND ROOFING MATERIAL

[75] Inventors: Jürgen Krautter, Darmstadt; Willi Dzialas, Griesheim, both of Fed. Rep. of Germany

[73] Assignee: Rohm GmbH Chemische Fabrik, Darmstadt, Fed. Rep. of Germany

[21] Appl. No.: 688,608

[22] Filed: Jan. 2, 1985

[30] Foreign Application Priority Data

Jan. 3, 1984 [DE] Fed. Rep. of Germany ....... 3400079

[51] Int. Cl.⁴ .............................................. B32B 5/16
[52] U.S. Cl. ................................... 428/328; 428/329; 428/331; 428/451; 428/701
[58] Field of Search ............... 428/328, 329, 331, 451, 428/701

[56] References Cited

U.S. PATENT DOCUMENTS 4,481,254 11/1984 Fukushima ........................ 428/331

Primary Examiner—Marion C. McCamish
Attorney, Agent, or Firm—Oblon, Fisher, Spivak, McClelland & Maier

[57] ABSTRACT

A water-spreading plastic material, comprising a plastic base having a water-repellent surface and having coated thereon:
(1) an adhesive comprising a non-water-soluble, organic solvent soluble and essentially non-swellable polar group containing polymer and,
(2) a water-spreading layer adhered to said base by said adhesive, being composed of colloid particles selected from the group consisting of silicon oxide, a metallic oxide, and a mixture thereof.

24 Claims, 1 Drawing Figure

WATER SPREADING PLASTIC MATERIAL, METHOD FOR ITS MANUFACTURE AND ITS USE AS A GLAZING AND ROOFING MATERIAL

BACKGROUND OF THE INVENTION

1. Field of the Invention

The invention relates to a water-spreading plastic material which is useful as a roofing, celling or glazing material.

2. Description of the Prior Art

Water-spreading plastics have the characteristic that water getting thereon will not be drawn up into separate droplets but rather will be spread so as to coalesce into a cohesive layer. This results in improved light reflection from the water-moistened surface and, in the case of transparent plastics, improved light transmission. Additionally, it is more difficult for water to drop from the underside of such plastic elements. These characteristics are particularly desirable for glazing materials for greenhouses, indoor swimming pools and similar humid structures. With respect to these materials, it is desirable that condensation forming thereon should not fall off in droplets, but rather should flow downwardly, following the shape of the material in a coherent layer, or at least flow in cohesive streams.

Numerous attempts have been made to produce coatings to protect against condensation which might collect on a plastic surface. One such type are those made of crosslinked hydrophilic polymer. For instance, according to DE-OS No. 21 61 645, a coating of this type is produced from a mixed polymer of alkyl ester, hydroxyalkyl ester and quarternary aminoalkyl ester of acrylic or methacrylic acid and methylol ethers of methacrylic amide as linking agents. Such coating are rather interesting since they initially are not water spreading in nature but become so as they absorb water and thereby swell, gradually changing into a water-spreading coating. As a result of the swelling, however, the coating is soft and susceptible to mechanical damage.

In order to achieve a greater mechanical durability, coatings were developed with hydrophilic inorganic components in a hydrophilic binding agent. In JP-A No. 76 81 877, PVC (polyvinylchloride) or polymethyl methacrylate films (or sheets) are covered with a coating of colloidal aluminum oxide as a hydrophilic, solid content material and polyvinyl alcohol and ammonium polyacrylate as binding agents. However, in its water-swollen condition, this coating is also mechanically sensitive.

It has also been attempted to place crosslinking agents into the plastic material itself. Water-spreading coverings for greenhouses and similar humid structures are manufactured, according to DE-PS No. 2 017 002, from a plastic containing a surface active agent, such as polyalkyl glycol. The effect of this additive is limited, and in addition, the weather resistance of the plastic is reduced.

In JP-A No. 76 06 193, polymethyl methacrylate plates having a coating of 95 parts colloidal silicon dioxide and 5 parts of a dispersion of a hydrophobic acrylic resin is suggested as a glazing material for greenhouses. The adhesion of this coating, however, is completely unsatisfactory, particularly when moistened.

A better adhesion of a condensation-protective coating on plastics is achieved according to EP-A No. 51 405 with a covering composed of two layers. Both of these layers contain colloidal silicon dioxide, a partially hydrolyzed silicone and polyvinyl alcohol as a binding agent. The ratio of silicon to carbon is greater in the lower layer than in the outer layer.

The Japanese reference No. 83/63 729 discloses a two-stage manufacturing method for a water-spreading coating on plastics which is not susceptible to being washed off. A solution of a non-water-soluble, anion-active polyelectrolyte, dissolved in an organic solvent, is applied in a thin layer as a base coat. Examples are mixed polymers of methyl and butyl methacrylate and methacrylic acid or of styrene and maleic acid. An aqueous, positively electrically charged, inorganic colloidal sol is applied to the base coat and is adsorbed as a result of the reciprocal action with the anion-active base coat. One example of this type of colloidal sol is a cation-active clay sol sold in commerce by Nissan Chemical Industries Ltd. under the name "Aluminasol 100." Although this coating exhibits a good water-spreading effect, it has the disadvantage of being highly sensitive to mechanical damage. In the wet-scouring test according to DIN 53 778, linear areas of detachment (separation) appeared after just 10 scouring strokes and after 50 scouring strokes the coating was completely separated. For the stresses greenhouse glazing is subjected to during erection and operation, this is completely unsatisfactory.

The great number of condensation-protective covering systems for plastics makes evident that the strong need for a coating that is useable in practice has not been sufficiently provided for by the coverings developed to date. Strongly hydrophilic covering materials generally achieve a good waterspreading effect, but in swelled condition they are too soft. If one attempts to combat this disadvantage with stronger crosslinking or reduced hydrophilic properties, then the water-spreading capability is lost together with the mechanical sensitivity. Silicon dioxide and various other metallic oxides combine the advantage of greater hardness and good water wettability without swelling. But these oxides have no adhesion to the surface of a plastic whatsoever. Adhesive base layers improve the adhesion of the oxides, but even they remain inadequate to the practical requirements.

To the degree that binding agents are used to anchor the oxides to the surface of the plastic, the wettability of the oxides is reduced and the disadvantages of binding agents appear: namely mechanical sensitivity in the case of hydrophilic binding agents and insufficient water-spreading in the case of hydrophobic binding agents.

It is indeed known to apply coverings of colloidal silicic acid onto a substrate having a textured surface, such as texturized fibers or paper, for example, to reduce surface sliding properties. In these cases, the silicic acid is anchored onto the surface of the substrates. Such silicic acid covering has been used as an anti-cling agent on a plastic film, whereby permanent adhesion is hindered. Thus, the rolled end of the plastic is prevented from clinging until it is removed from its supply roll. Anti-clinging property is provided by partially destroying the silicic acid coating when separating adjacent layers of the plastic.

SUMMARY OF THE INVENTION

Accordingly, an object of this invention is to provide a novel material which satisfies the long unsatisfied need for a practical, useful water-spreading plastic coating.

It is another object of this invention to provide a water-spreading plastic coating with a covering which exhibits improved bonding strength.

It is another object of this invention to provide a water-spreading plastic coating with a covering which exhibits reduced mechanical sensitivity in moist conditions.

It is another object of this invention to provide a water-spreading plastic coating with a covering which exhibits improved adhesion permanence.

It is another object of this invention to provide a water-spreading plastic coating with a covering which exhibts good water-spreading properties.

Antifogging, in the sense that condensation water is absorbed by the coating, is not a goal of this invention; a rapid flowing together (or joining) of the condensation droplets is.

These and other objects of this invention as will hereinafter become more clear, have been attained with a water-spreading plastic material which comprises a plastic base having a water-repellent surface and coated thereon (1) an adhesive and (2) a water-spreading layer. The adhesive comprises a non-water-soluble, organic solvent soluble and essentially non-swellable polymer which contains a polar group. The water-spreading layer is adhered onto the base by the adhesive, and is composed of colloid particles selected from the group consisting of silicon oxide, a metallic oxide and mixtures thereof.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. I is a cross-sectional illustration of a box-like apparatus for the evaluation of the water-spreading effect of various glazing materials.

DETAILED DESCRIPTION OF THE PREFERRED EMBODIMENTS

Figure 1:
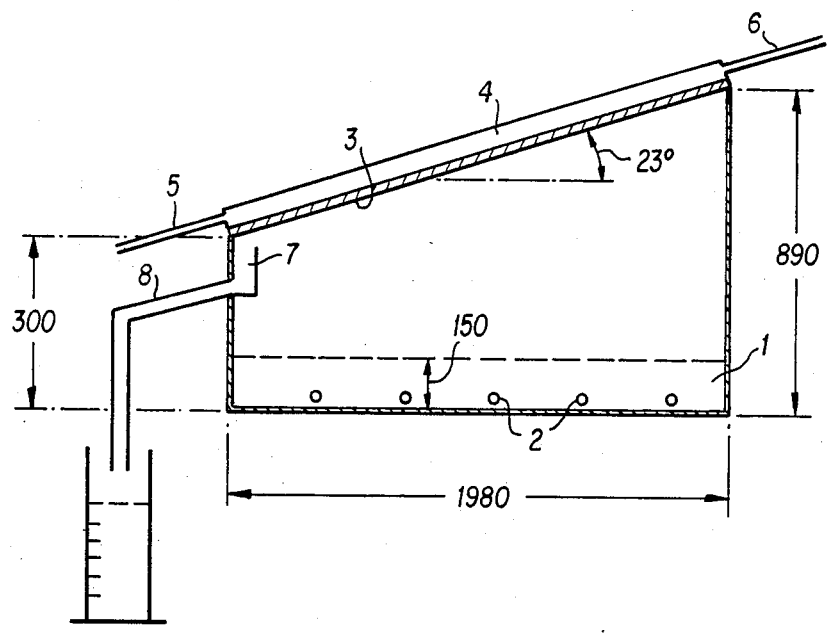

It has been found that colloid sized particles of silicon oxide, a metallic oxide, or a mixture thereof on an adhesive layer of a non-water-soluble and an essentially nonswellable polymer material containing at least one polar group, adhere significantly better than cationically modified inorganic colloidal particles. This is particularly the case for an adhesive having a polar group which is neither a base nor a salt. The strength of adhesion of the water-spreading layer, as measured by the stroke count in a wet scouring test, will be increased by at least two orders of magnitude, as compared with coatings of the prior art. The magnitude of increased adherence strength is as much as three to four orders of magnitude superior to the prior art in some embodiments of this invention.

It has now been found that the intermediate placement of a non-swellable polymer layer having at least one polar group makes it possible to securely bond the binding agent-free layer of the aforementioned neutral or weakly anionic silicon and/or metallic oxide, to the surface of a water-repellent plastic. The polymer must bind to two different components: the plastic surface which is hydrophobic and the water-spreading layer which is hydrophilic. While there are various polymer materials which adhere to a water-repellent plastic surface, adhesion to the water-spreading layer is more difficult. It has now been suprisingly found that a non-swellable polymer layer having at least one polar group possesses these desirable characteristics of securely binding the silicon and/or metallic oxide to the surface of a water-repellent plastic.

In addition, it has also been found that the light transmission properties of the coated plastic material are higher, even when dry, as compared with the same plastic without the coating of the present invention.

The Water Spreading Layer

Suitable as the water-spreading layer are oxides, such as silicon dioxide and aluminum oxide, as well as oxide mixtures or mixed oxides. Advantageous, for example, are silicon-aluminum mixed oxides with an Si/Al ratio of from 1:1 to 30:1. They can be partially neutralized with a base and thus would contain a cation, such as an alkali or ammonium ion. The latter align very easily during drying. Anionically modified silicon dioxide and non-water-soluble metallic oxides are also useful.

Other metallic oxides, which can be contained in the water-spreading layer in addition to, or instead of, silicon or aluminum oxide, can be derived from the elements, for example, of zinc, titanium, zirconium or chromium. Colorless metallic oxides are preferred, where color is a factor. It is always a requirement that the oxides be practically insoluble in water. The solubility of the oxides per se or the hydrated form thereof, in water at 20° C., should lie below 200 ppm.

The oxide layer exerts a strong water-spreading effect. This is apparently the result of both the good water wettability of the oxides as well as the submicroscopic roughness of the oxide layer.

The metallic oxide can be applied from an aqueou colloidal suspension. Howeve colloids in polar liquids, such as dimethyl formamide or isopropanol, or in aqueous solution mediums, such as mixtures of acetone, methanol or ethanol with water, can also be used. The colloidal state of course, is usually facilitated by the use of a suitable surfactant. The colloid particles have a size of less than 200 nm, and preferably less than 120 nm, particularly from 5 to 100 nm. The pure oxides are usually present in the colloid in more or less hydrated and neutralized forms, which can be used in the present invention in that form.

Colloidal silicic acid is commercially available in various useable preparations. Particularly suitable are anionic types which contain a cation, such as an alkali or ammonium ion, for stabilization.

It is material to the invention that the water-spreading layer, aside from any potential surfactant content which may still be present, comprises primarily, more than 90% by weight, and preferably more than 99% by weight, of silicon oxide, metallic oxide or mixture thereof. The silicon oxide may be, e.g., silicon dioxide. It is preferable that there be no other components that are not water soluble. In any case, there must be a water-spreading property which corresponds to a contact angle formation with a water droplet on the water-spreading layer of less than 20°, and preferably less than 10°.

An additional important characteristic of the water-spreading layer is its thickness. It has been found that the delamination tendency of the layer greatly increases with the thickness. Since with respect to the effectiveness of the layer, only its uninterrupted surface and not its thickness is of any significance, the thinnest possible layer that can be produced with the colloid employed will result in the best possible effect. Therefore, a layer thickness of from 0.01 to 4 μm, and particularly from 0.1 to 1 μm, is preferred.

The Adhesive

The adhesive according to the present invention adheres to the water-spreading layer and to the water-repellent plastic surface. If desired only a portion of the base element is provided with a water-spreading coating. In this case the adhesive may only be applied to those corresponding areas.

The critical characteristic of the adhesive is that it must be a polymeric material having at least one polar group and must be insoluble and non-swellable. The polar groups do not have to be chemically bonded to the primary component of the adhesive layer, although this is preferred. It is sufficient if the polar groups are chemically bonded to a secondary component. It is assumed that the adhesion arises through a reciprocal effect between the oxygen atoms or hydroxyl groups of the oxides and the polar groups. Since water molecules are also capable of a strong reciprocal effect with the oxide oxygen atoms and can displace the polar groups, the polymer material of the adhesive layer should absorb as little water as possible. In addition, the adhesive strength would also be reduced through morphological changes as a result of repeated swelling and unswelling. This illuminates the significance of a reduced swellability together with a limited polarity, although the invention is not intended to be limited to a given theory.

The organic material of the adhesive layer consists of at least one polymeric or macromolecular substance having a gravimetric average molecular weight of more than 1000, and preferably more than 10,000. This can be an organic material having a comprehensive carbon framework or a carbon framework interrupted by oxygen or nitrogen atoms, or a mixed organic-inorganic material having a comprehensive basic framework comprised partially of heteroatoms such as oxygen and silicon.

The polymer material must contain at least one polar group, particularly a hydroxyl, carboxyl, sulfonyl, carboxylic acid amide, nitrile or silanol group. The polar group is preferably a component of a macromolecular compound which simultaneously contains a non-polar group, such as an alkyl, alkylene, aryl or arylene group. The ratio of polar to non-polar groups must be selected such that adhesion is achieved both to the water-repellent, i.e. non-polar plastic surface as well as to the water-spreading, i.e. hydrophilic layer. The polarity must not be so great that the material of the adhesive layer itself is water-soluble or water-swellable. The swelling at saturation with water at 20° C. should not lie above 10% by volume and preferably not above 2% by volume. On the other hand, the polarity must not be so low that the material becomes soluble in completely non-polar solvents, such as benzene. Most suitable are those which are soluble in organic solvents of restricted polarity, such as hydrocarbon chlorides, esters, ketones, alcohols or ethers or mixtures thereof with aromatic compounds. The material of the adhesive is itself, usually, not water-spreading. Water droplets on its surface generally form a contact angle of more than 20°, and more particularly, from 20° to 70°.

The necessary balancing of affinities to the two interfaces is generally achieved if the material of the adhesive layer contains from 0.4 to 100 polar groups milliequivalent for each 100 g of the polymer material.

It is also advantageous for the polymer material to be three dimensionally crosslinked (thermoset). In case the adhesive layer is made from a solution of the polymer material, a crosslinking of this type may only be induced after the adhesive layer has been formed. The crosslinking reduces the swelling capacity. It should not be so strong that the polymer material is completely hard and brittle. A certain elastic resiliency of the crosslinked polymer is advantageous.

A suitable class of polymer materials comprises polymers or mixed polymers of vinyl monomers. At least a portion of the vinyl monomer units must include a polar group of the abovementioned type. It can originate from the original monomers or be introduced into the polymers by subsequent transfer. A portion of the vinyl monomers contains non-polar groups, such as alkyl, alkylene, aryl or arylene groups.

The polar groups differ in their polarizing effectiveness, which increases in the following order of progression: nitrile, hydroxyl, primary carboxylic acid amide, carboxyl, sulfonyl, and silanol. The stronger the polarizing effect, the lower is the required content of polymer material. While 4 to 100 polar groups milliequivalents per each 100 g of polymer material are used with the weak polar groups, 0.4 to 20 milliequivalents/100 g are sufficient for the strong polar groups. If the polar group content is selected too low, there will not be a satisfactory adhesion of the water-spreading layer. If, in contrast, the polar group content is too high, the water-swelling capacity increases too much, which again reduces the adhesion.

Included among the vinyl monomers which carry the mentioned groups are, for example, acrylic and methacrylic nitrile, hydroxyalkyl esters of unsaturated polymerizable carboxylic acids, particularly those with 2 to 6 carbon atoms in the hydroxyalkyl residue, glycidyl acrylate, and methacrylate, or the dihydroxyalkyl esters produced therefrom through hydrolysis, the amides of the above-mentioned acids, particularly acrylic amide and methacrylic amide, acrylic acid, methacrylic acid, maleic acid, fumaric acid, or itaconic acid, as well as vinylsulphonic acid, styrenesulphonic acid, acrylic and methacrylic amidoalkanesulphonic acids, acryloxy and methacryloxyalkyl-trialkyl silanes and their products of hydrolysis. Polar groups that are neither bases nor salts are preferred, particularly hydroxyl, carboxyl, carbon amido and silanol groups.

Suitable vinylmonomers with non-polar groups are the alkyl esters of unsaturated, polymerizable acids, such as, for example, acrylic acid, methacrylic acid, maleic acid, fumaric acid or itaconic acid. The alkyl residues generally contain from 1 to 18 carbon atoms, preferably from 1 to 8 carbon atoms. Also suitable monomers are styrene, vinyl toluene, vinyl acetate, vinyl propionate and other vinyl esters of fatty acids, vinyl chloride, and vinylidene chloride.

Mixed polymers or copolymers of polar and non-polar vinyl monomers can be produced according to known methods of free radical polymerization, for example through solution or emulsion polymerization. The resulting solutions or dispersions can, if desired, after first being thinned, be directly employed to produce the adhesive layer.

Other classes of suitable polymer materials for the adhesive are polyesters, polyethers, polycarbonates, polyurethanes or epoxy resins having polar groups. The polar groups can be components of the original material employed or they can be introduced into the polymer material subsequently. Polymeric materials with hydroxyl groups, for example, can be converted with silanes, which carry at least two silicon-bonded halogen atoms, alkoxy groups or aryloxy groups. Suitable examples are tetrachlorosilane, tetraethoxysilane, tetraphenoxysilane, methyltrimethoxysilane or methyltrichlorosilane. Through hydrolysis of the thus introduced groups, perhaps after first forming the adhesive layer, polar siloxane groups are formed. They have the advantage over the other polar groups that they exert a very strong bond to silicon and aluminum oxide and yet hardly affect the water-swelling capacity of the adhesive layer. Therefore, polymer materials having Si-OH groups as an adhesive represent a preferred embodiment of the invention. The adhesive effect is achieved at both boundary surfaces; to the water-repellent plastic layer on one side and to the water-spreading layer on the other side. To achieve this, the thinnest possible layer is desirable. The layer may therefore, be 0.01 to 20 $\mu m$ and preferably only 0.01 to 2 $\mu m$ in thickness. Thinner layers are difficult to produce with complete coverage. Thicker layers are less economical, but fully effective technically.

The Coating Process

The coating process according to the present invention can be performed directly following the manufacture of the plastic base element. In some cases however, for example during the coating of polyolefin plastics, a corona discharge treatment of the surface to be coated is useful prior to the application of the adhesive layer.

The adhesive layer can be applied as an aqueous dispersion or an organic solution of the coating agent. Where the layer is extremely thin the dispersion or solution can be applied in a highly thinned form. Concentrations of from 0.1% to 40% wt., preferably from 1 to 10% wt. are effective. The liquid coating agent can be applied by painting, pouring, rolling, spraying or any other known method. The applied coating liquid, if necessary, can be distributed uniformly with a doctor, for example a wire doctor, a toothed doctor, a rubber or an air doctor. Immediately after application, the liquid component is evaporated, for example in a warm air dryer. Subsequently, the oxide layer is applied in the same way. It is preferable that a colloidal, aqueous solution or dispersion of the oxide be applied. It is also possible, however, to apply a compound of silicon or other metal which is then hydrolyzed on the surface. For example, a solution of an orthosilicic acid ester can be applied in a weakly acidulated alcohol. The ester is hydrolyzed during or after the drying of the coating. It is important that the coating liquid achieves complete coverage. This can be facilitated if necessary by the addition of—preferably non-ionic—surfactants. Suitable surfactants include, for example, oxyethylated fat alcohol in a concentration of from 2 to 20% by weight surfactant, relative to the oxide content, and preferably from 3 to 5% by weight. It is preferable that no more of the surfactant is used than is necessary for uniform wetting. The water is subsequently evaporated, again preferably in a warm air dryer. During the drying process the temperature in the coating generally does not climb above 50° to 60° C. The adhesion and resistance to being rubbed off are again noticeably improved if the dried coating is heated even further for a given period, for example, at least 3 minutes and preferably 5 to 10 minutes at more than 80° C. Depending on the type of plastic, temperatures of more than 100° C. can be used, sometimes up to 150° C.

Thereafter, the coated plastic element can be used for the intended purpose. For transport from the place of manufacture to the location of use, the surfaces of rigid plastic elements are usually protected at least by a weakly adhering, easily removable foil. The protective foil can be made of paper or plastic; but polyolefin foils are preferred. It has been demonstrated that, for this purpose, common protective wraps, which have an adhesive layer, adhere more strongly than is desired to the coated surface. In order to ease the removal of the protective foil at the place of use, another thin layer of a water-soluble material is applied onto the water-spreading layer. For example, dextrine, cellulose ethers, sodium polyacrylate and methacrylate, polyvinyl alcohol or gelatins. The protective foil can be removed easily from the intermediate layers. The water-soluble intermediate layer does not need to be removed, because it itself has a water-spreading effect. In time, it will be removed by the flowing condensation water, leaving then the permanent water-spreading coating according to the invention.

The Plastic Material to be Coated

The outer shape of the plastic materials coated in accordance with the present invention is irrelevant. The coating of the present invention can find interesting application to a wide variety of uses where it is required that water collecting thereon will not remain in droplet form, but rather will coalesce into a cohesive layer. These qualities are particularly desired for glazing, celling and roofing materials.

Preferred surfaces to be treated by the methods of this invention are surfaces of films, sheets or panels. Particularly, good candidates for coating are attained with films of less than 1 mm thickness down to about 0.01 mm and preferably lying between 0.05 and 0.5 mm thickness. Particularly, goods results are attained with sheets of more than 1 mm thickness up to about 10 mm and preferably between 2 and 6 mm in thickness. Particularly, good candidates for coating are one-piece extruded hollow plates, and double plates having reinforcing cross members, where the plates have a total thickness of between 5 and 50 mm and exterior walls of a thickness of from 1/20 to $\frac{1}{8}$ of the thickness of the plate which are connected in one piece with each other by cross members running perpendicular or at an angle thereto.

The surfaces of the plastic materials to be coated are generally flat and smooth and are usually more or less shiny. The plastic material can be transparent, translucent or light-transmissible; preferably clear and colorless or transluscent white.

The coatings of the present invention are suitable for all plastics having inherently water-repellent surfaces, such as primarily plastics which themselves contain no or only a negligible amount of polar groups in their structure. Included among these are, for example, polyethylene, polypropylene, polystyrene and its modified impact resistant derivatives, polyvinyl chloride and polyester. Such plastics are water-repellent if the contact angle of a water droplet lying thereon is more than 70°. Preferred plastics are polymethacrylates (acrylic glass) and polycarbonates, particularly that of bisphenol-A. These materials are used as rigid plastic glazing materials for greenhouses and indoor swimming pools, preferably in the form of extruded hollow plates.

The water-spreading layer according to the present invention can be applied to the surfaces of the plastic base element, but it is often preferred to coat only one side of a surface-forming material.

Evaluation of the Water-Spreading Coating

The disadvantages of the formation of condensation water on the underside of uncoated plastic glazing, particularly in greenhouses, concern the reduction of light transmission and the falling of water drops. Both are caused by insufficient water-spreading.

Plastics, such a polymethylmethacrylate and polycarbonate, have a low solid body surface tension and are therefore difficult to wet with water. The contact angle of a water drop on the upper side of a horizontal, uncoated plate made from these plastics is about 75 degrees. The contact angle is meant as the angle between the wetted surface and the tangent on the surface of the water drop at the point of contact with the surface. A method for determining the contact angle is described in DE-OS No. 20 17 002, column 3, lines 23 to 48.

Droplets with a contact angle of 75 degrees almost form a complete hemisphere. The light striking the drop from the back side is to a large degree reflected and is therefore lost for the illumination of a glass-enclosed room, and in the case of greenhouses, for the growth of the plants.

The falling of drops arises in that more or less hemispherical drops of condensation water begin to run, in dependence on the angle of inclination of the glazing and the size of the drops, and are joined with other drops along the way. As soon as a critical size is reached, the drop falls. Plant cultures growing beneath the glazing can thereby be damaged.

The formation of condensation water also cannot be prevented on a water-spreading surface. The condensing water quantity depends solely on the degree to which the glass surface falls beneath the dew point of the air. The water drops condensed on a water-spreading surface have a smaller contact angle and cause less or no reflection of the light striking them from the back side. In addition, even with small sized drops, they flow together and run in streams or as a film in the direction of inclination, so that, depending on the water-spreading effect, less or even no water drops away.

To evaluate the water-spreading effect of various glazing materials a box-like apparatus was employed, which is illustrated in cross section in the drawing, with the dimensions given in millimeters. The depth is uniformly 230 mm; the side surfaces lying in front of and behind the sectional plane are closed. The floor of the apparatus is covered with a 150 mm deep layer of water which is held at a constant 40° C. by means of the heating elements 2.

The glazing material to be tested forms the underside of a hollow chamber 4, through which water at 13° C. flows via the supply line 5 and the discharge line 6.

The glazing material 3 is arranged at an angle of 23°. If a water-spreading coating is provided, it is located on the underside. The runoff condensation water is collected in a channel 7 and is led into a measuring container 9 through a line 8.

For evaluation, the quantity of water collected within 24 hours was measured. Since the quantity of condensation water should be practically equal in all tests, the deficiency in the collected water quantity from a poorly spreading glazing material relative to the water quantity of an optimally, spreading material represents the quantity of water that has dropped away. A thoroughly cleansed and degreased glass surface produces almost no drops and can be used as the optimal standard.

Also belonging as an essential characteristic in the evaluation of various glazing materials is the durability or mechanical sensitivity to mechanical stresses when wet. Therefore, the tested glazing materials were subjected to the wet scouring stress test according to DIN 53778 (corresponding to ASTM D 2486-69T) and the number of scouring strokes was determined at which there resulted a clear reduction in water-spreading capability.

The results of the condensation water test and the wet scouring stress test are compiled for the tested glazing materials in the following table.

| Substrate | Adhesive Layer | Water Spreading Layer | Wet Scouring Resistance (No. of Scouring Strokes) | Condensation Water Quantity in ml/24 hr |
|---|---|---|---|---|
| Silicate Glass | none | none | — | 1400 |
| PMMA | none | none | — | 70 |
| Silicate Glass | none | A | 2 | 1400 |
| PMMA | none | A | 2 | 650* |
| PMMA | none | B | 2 | 1400 |
| PMMA | M | B | 2 | — |
| PMMA | none | C | 10 | — |
| PMMA | N | C | 100–200 | —(Ex. 5) |
| PMMA | M | C | >20,000 | 1400 (Ex. 7) |
| PMMA | none | D | 10 | — |
| PMMA | N | D | 200–500 | —(Ex. 1) |
| PMMA | M | D | >20,000 | 1400 (Ex. 3) |

Explanations:
*The water-spreading layer was very effective at the beginning but separated after 12 hours.
N = Adhesive layer made from a co-polymer of butylmethacrylate, methylmethacrylate, alkylated methylolmethacrylic amide, hydroxyethylacrylate.
M = Adhesive layer made from a co-polymer of methylmethacrylate and methacryloxypropyl-trimethoxysilane.
A = Commercial water-spreading coating for silicate glass or plastic (Sunclear G. Solar Sunstill, USA)
B = Like A, but after drying period of 5 minutes at 80° C.
C = Commercial aqueous colloidal, slightly anionic silicic acid (Kieselsol A200, Bayer AG)
D = Commercial aqueous colloidal, slightly anionic, silicon dioxide modified on the surface with aluminum oxide, (Ludox AM, DuPont)
PMMA = Polymethylmethacrylate Other features of the invention will become apparent in the course of the following description of exemplary embodiments which are given for illustration of the invention and are not intended to be limiting thereof.

EXAMPLE 1

A plate of extruded polymethylmethacrylate is covered on one surface by means of a wire doctor with a 4 μm thick film of a 2.5% solution of a mixed polymer comprising 47% by weight butylmethacrylate, 47% by weight methylmethacrylate, 3% by weight of an alkylated N-methylol methacrylic amide and 3% by weight hydroxyethylacrylate in a mixture of isopropyl alcohol and toluene. The mixed polymer contains 26 polar group milliequivalent/100 g. After drying the polymer layer is 0.1 μm thick. It is heated for 5 minutes at 80° C. and after cooling it is covered with a 12 μm thick layer of a 3%, slightly anionic aqueous silicic sol (commercial product Ludox AM, DuPont) modified at the surface with aluminum oxide, which sol contains 0.01% by weight of an 8x oxethylated isotridecylic alcohol as a non-ionic emulsifying agent. The still-wet coating is dried for 5 minutes in an ambient air heating cabinet at 80° C. The resulting SiO$_2$ layer has a thickness of 0.15 μm.

A water drop placed on the flat-lying coating spreads until it forms an contact angle of less than 10°. In the wet scouring test the coating becomes ineffective after 200 to 500 scouring strokes.

EXAMPLE 2

The method according to example 1 is repeated, except that the adhesive layer is made from a mixed polymer of 47% by weight butylmethacrylate, 47% by weight methylmethacrylate, 3% by weight glycidylmethacrylate and 3% by weight methacrylic acid. With the assumption of a complete exchange of the glycidyl groups with the carboxyl groups of the methacrylic acid, the layer contains, for each 100 g of polymer, 21 of hydroxyl milliequivalents and 14 carboxyl groups milliequivalents, which corresponds to a total of 35 milliequivalents/100 g for polar groups. The water-spreading layer is applied as in example 1.

The contact angle of a water droplet placed on the layer is less than 10°. After 20,000 scouring strokes the coating is still fully effective with respect to its spreading properties.

EXAMPLE 3

The method according to example 1 is repeated, except that the adhesive layer is produced from a mixed polymer of 87.6% by weight methylmethacrylate and 12.4% by weight γ-methacryloxypropyl-trimethoxysilane. After hydrolysis of the siloxane groups it contains 50 milliequivalents/100 g of polar silanol groups.

The contact angle of a water drop placed on the coating is less than 10°. After 20,000 scouring strokes the coating is still fully effective.

EXAMPLE 4

The method according to example 1 is repeated, except that the adhesive layer is produced from a mixed polymer of 85.6% by weight methylmethacrylate, 12.4% by weight γ-methacryloxypropyl-trimethoxysilane and 2% by weight N-butoxymethylmethacrylamide. After hydrolysis of the siloxane groups, it contains 50 milliequivalents/100 g of polar silanol groups.

The contact angle of a water drop placed on the coating is less than 10°. The coating is still fully effective after 10,000 scouring strokes.

EXAMPLES 5-8

The coating method according to examples 1 through 4 are repeated with the exception that a different, slightly anionic, aqueous silicic sol (commercial product Kieselsol A200, Bayer AG) is employed in the same concentration.

The contact angles in all cases are less than 10°. In the wet scouring test, the adhesive layer according to example 1 exhibited a loss of effectiveness after 100 to 200 scouring strokes (example 5). The other coatings were still fully effective after 20,000 scouring strokes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A water-spreading plastic material, comprising a plastic base having a water-repellent surface and having coated thereon:
 (1) an adhesive comprising a non-water-soluble, organic solvent soluble and essentially non-swellable polar group containing polymer and,
 (2) a water-spreading layer adhered to said base by said adhesive, being composed of colloid particles selected from the group consisting of silicon oxide, a metallic oxide and a mixture thereof.

2. The water-spreading plastic material of claim 1, wherein the polar group of the polymer is neither a base nor a salt.

3. The water-spreading plastic material of claim 1, wherein at least one of the polar groups of the polymer is selected from the group consisting of a nitrile group, a hydroxyl group, a primary carboxylic acid amide group, a carboxyl group, a sulfonyl group, a silanol group, and a mixture thereof.

4. The water-spreading plastic material of claim 1, wherein the water-spreading layer is from about 0.01 to 4 μm thick.

5. The water-spreading plastic material of claim 1, wherein the adhesive layer is from about 0.01 to 20 μm thick.

6. The water-spreading plastic material of claim 1, wherein said material includes a water-soluble coating over the water-spreading layer, and a protective foil which is detachably adhered to said coating.

7. The water-spreading plastic material of claim 6, wherein said water-soluble coating contains at least one member selected from the group consisting of dextrine, a cellulose ether, a sodium polyacrylate, a sodium polymethacrylate, polyvinyl alcohol, a gelatin and a mixture thereof.

8. The water-spreading plastic material of claim 1, wherein said water-spreading layer is composed of colloid particles selected from the group consisting of a non-water-soluble metallic oxide, an anionically modified silicon dioxide and a mixture thereof.

9. The water-spreading plastic material of claim 1, wherein said water-spreading layer contains a mixture of silicon oxide and aluminum oxide with a Si to Al ratio of from 1:1 to 30:1.

10. The water-spreading plastic material of claim 1, wherein said water-spreading layer is further composed of colloid particles selected from the group consisting of a zinc oxide, a titanium oxide, a zirconium oxide, a chromium oxide and a mixture thereof.

11. The water-spreading plastic material of claim 1, wherein said silicon oxide and metallic oxide each have a solubility in water at 20° C., of less than about 200 ppm.

12. The water-spreading plastic material of claim 1, wherein said colloid particles have a size of less than 200 nm.

13. The water-spreading plastic material of claim 1, wherein said water-spreading layer forms a contact angle with a water droplet lying thereon, of less than about 20°.

14. The water-spreading plastic material of claim 1, wherein said polymer is an organic polymer.

15. The water-spreading plastic material of claim 1, wherein said polymer has a weight average molecular weight of more than 1000.

16. The water-spreading plastic material of claim 1, wherein at saturation the polymer does not swell above 10% by volume.

17. The water-spreading plastic material of claim 1, wherein the adhesive forms a contact angle with a water droplet lying thereon, of from 20° to 70°.

18. The water-spreading plastic material of claim 1, wherein the adhesive contains from 0.4 to 100 polar groups milliequivalents for each 100 g of the polymeric material.

19. The water-spreading plastic material of claim 1 wherein said polymer is made up of at least one monomer selected from the group consisting of acrylic acid, methacrylic nitrile, a hydroxyalkyl ester of an unsaturated polymerizable carboxylic acid, acrylic amide, methacrylic amide, methacrylic acid, maleic acid, fumaric acid, itaconic acid, vinylsulphonic acid, styrenesulphonic acid, acrylic amidoalkanesulphonic acid, methacrylic amidoalkanesulphonic acid, a acryloxytrialkylsilane, a methacryloxytrialkylsilane and a mixture thereof.

20. The water-spreading plastic material of claim 1, wherein said polymer is at least one member selected from the group consisting of a polyester, a polyether, a polycarbonate, a polyurethane, an epoxy resin and a mixture therof.

21. The water-spreading plastic material of claim 1, wherein said polymer contains a Si-OH group.

22. The water-spreading plastic material of claim 1, wherein said plastic base is at least one member selected from the group consisting of polyethylene, polypropylene, polystyrene, polyvinyl chloride, polyester, polymethylmethacrylate, polycarbonate and a mixture thereof.

23. The water-spreading plastic material of claim 1 wherein said plastic base forms a contact angle with a water droplet lying thereon, of at least 70°.

24. A water-spreading plastic material, comprising a plastic base having a water repellent surface and having coated thereon (1) an adhesive comprising a non-water-soluble, organic solvent soluble and essentially non-swellable polar group containing polymer, and (2) a water-spreading layer adhered to said base by said adhesive, being composed of colloid particles selected from the group consisting of a zinc oxide, a titanium oxide, a zirconium oxide, a chromium oxide and a mixture thereof.

* * * * *